Patented Aug. 18, 1942

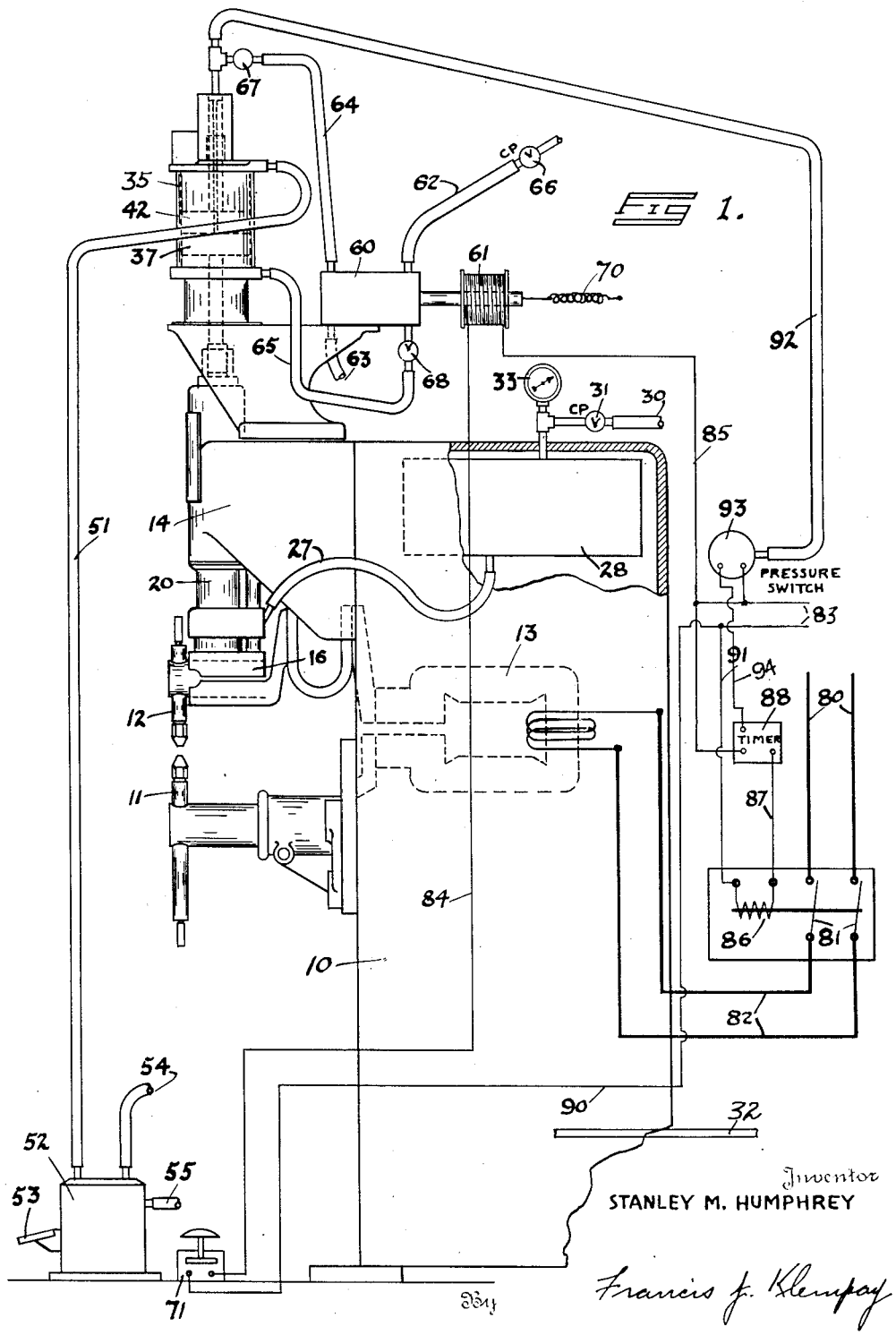

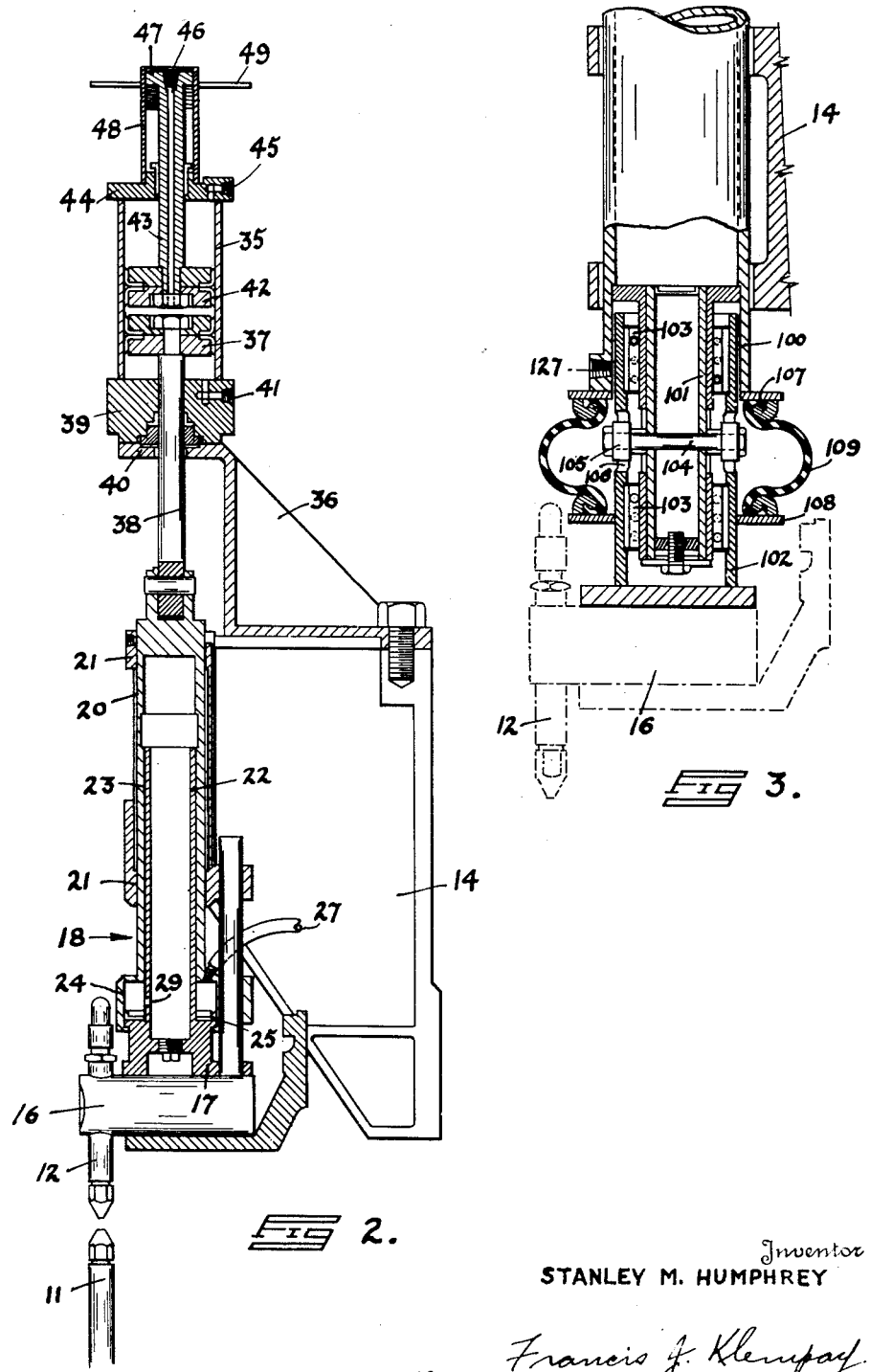

2,293,393

UNITED STATES PATENT OFFICE 2,293,393

OPERATING MECHANISM FOR WELDING ELECTRODES

Stanley M. Humphrey, Warren, Ohio, assignor to Taylor-Winfield Corporation, Warren, Ohio, a corporation of Ohio Application November 25, 1939, Serial No. 306,127

16 Claims. (Cl. 219—4)

This invention relates to an operating mechanism for electrodes of welding apparatus and more particularly to an improved arrangement for operating a movable electrode of a pair of electrodes in a welding machine for the purpose of facilitating the entry and withdrawal of work from between the electrodes and for the purpose of effecting the optimum character of movement of the movable electrode during the welding operation. The invention has as one of its objects the provision of an economical arrangement for effecting the compound movements of the electrode as necessitated by the desirability of a readily operating means for moving the electrodes a substantial distance apart for the insertion in the machine of composite forms to be welded and by the requirement of quick following movement on the part of the electrodes from a position in pressure engagement with the outer surfaces of the material to be welded toward each other during and/or immediately following the application of the welding current whereby satisfactory welds may be made in the material.

More specifically, the primary object of the invention is the provision of an arrangement having the functions outlined above, which arrangement is capable of being embodied in readily controlled and quick acting mechanisms whereby the productive capacity of the machine to which the arrangement is applied may be enhanced.

Another object of the invention is the provision of an improved mechanism for moving a welding electrode during the welding cycle which is capable of performing its function without the presence of any static friction whatsoever between relatively moving parts of the mechanism. This is contemplated and accomplished in accordance with the present invention by so arranging and designing the various elements of the machine that during the application of the welding current and immediately thereafter, relative movement between slidably contacting elements of the electrode moving mechanism continues. The elimination of the static friction above referred to and the reduction in the inertia of the parts which move during the welding cycle results in improved following characteristics of the movable electrode with the subsequent substantial increase in the quality of the welds effected.

Yet another object of the invention is the provision in a welding machine of an improved arrangement for applying welding pressures to the electrode and for utilizing such pressures for the following movement of the electrode during the welding cycle.

These and other objects and advantages of the invention will become apparent from a consideration of the following detailed specification and the accompanying drawings wherein there is specifically disclosed preferred embodiments of the invention.

In the drawings:

Figure 1 is a side view of a welding machine constructed in accordance with the teachings of the present invention, the control system for the machine being shown schematically.

Figure 2 is a vertical cross-sectional view through the electrode moving mechanism of the machine of Figure 1; and Figure 3 is a sectional view through a modified form of a pressure applying and electrode moving means.

Referring to the specific embodiment of the invention illustrated in the drawings, the reference numeral 10 designates the frame of a welding machine carrying a manually fixed electrode 11 and a movable electrode 12. In accordance with usual practice, a welding transformer 13 having a manually operated regulator associated therewith is housed within the frame 10 and operatively connected with the electrodes 11 and 12. Mechanism to support and operate the movable electrode 12 is carried by a bracket 14, suitably secured to the frame 10.

As shown more clearly in Figure 2, movable electrode 12 is immediately carried by a block 16 which in turn is secured to the lower end of a piston 17 forming part of an air lock, indicated generally by reference numeral 18.

Air lock 18 consists of an outer cylinder or quill 20 slidably received in a guide bore 21 of the bracket 14. Quill 20 is closed at the top and open at the bottom to receive the upwardly extending cylindrical projection 22 of the piston 17. Quill 20 is provided with an upper bore 23 to receive the cylindrical projection 22 and a lower bore 24 of larger diameter than the bore 23 to receive the main body of the piston 17. A seal is provided between the piston 17 and the bore 24, which seal may be a conventional leather washer 25 or other suitable expedient.

The annular space immediately above the seal 25 and below the shoulder separating the bores 23 and 24 is connected by means of a flexible conduit 27 with an air tank 28 of appreciable volume housed within the welding machine frame 10. An aperture 29 is provided in the wall of the cylindrical extension 22 to interconnect the annular space above mentioned with the space within the quill 20 and the cylindrical extension 22. Tank 28 is kept filled at all times with air under predetermined pressure, a conduit 30 having a constant pressure valve 31 incorporated therein being provided to supply the air from an air supply conduit 32. An indicator 33 may be provided to show the pressure existing in the tank 28. The function of the air lock described immediately above is to apply welding pressure to the movable electrode 12 and to effect the following through movement of the electrode during the welding operation.

The operating stroke effected by the air lock is necessarily rather small, being approximately one inch maximum. To provide means of getting a longer stroke, for example, four or five inches, in order to allow for the insertion between the electrodes of flanged and other specially shaped forms and for the withdrawal of the forms upon completion of the welding operation, the mechanism now to be described is provided. A cylinder 35 is carried above the bore 21 on a bracket 36 secured to the bracket 14. Within the cylinder 35 is a lower operating piston 37 mechanically connected with the upper end of the quill 20 by means of the connecting rod 38. The lower end of the cylinder 35 is closed by the block 39 having a bore for the passage of the rod 38 and packing 40 to seal the rod in the bore. An air passage 41 is provided in the block 39 to supply air under pressure to the underside of piston 37.

Also positioned within the cylinder 35 is the upper floating piston 42 having rigidly connected therewith an upwardly extending rod 43. The upper end of the cylinder 35 is closed by the upper block 44 having a bore for the passage of the rod 43 with suitable packing about the bore to seal the sliding connection between the rod and block. An air passage 45 in the block 44 permits the passage of air to the space in the cylinder 35 above the piston 42. Rod 43 is provided with a central bore 46 extending down through the piston 42 to communicate with the space between the pistons 37 and 42. An outwardly directed flange 47 is provided at the upper end of the rod 43 and the peripheral surface of the flange is threaded to engage the threads on the interior surface of the thimble 48 threaded thereover. Thimble 48 is provided with a number of handles 49 to facilitate rotation of the thimble whereby the interval between the top of the rod 43 and the lower end of the thimble may be varied. There is thus provided readily manipulatable means for adjusting the length of stroke of the piston 42 and, incidentally, the downward limit of travel of the piston 42.

Air passage 45 supplying air under pressure to above piston 42 is connected through conduit 51 with a foot valve 52 operated by a foot lever 53. Valve 52, being a three-way valve, is connected with the air line 32 by means of a conduit 54 and is provided with an exhaust port 55. When the lever 53 is in its normally biased upper position, air under pressure will be admitted to the conduit 51 and consequently to the cylinder 35 above the piston 42. When the lever 53 is depressed by the foot of the machine operator the conduit 54 is closed and the conduit 51 connected with the exhaust 55 whereby the cylinder 35 above the upper piston 42 will be exhausted. Air under pressure is supplied to the space between the pistons 37 and 42 and to the space below piston 37 by means of the four-way valve 60 which is operated by solenoid 61. Valve 60 is provided with an inlet port 62 communicating with the air supply line 32, an exhaust port 63, a port connected with the bore 46 in rod 43 by means of a conduit 64, and a port connected through passage 41 with the space below operating piston 37 by means of a conduit 65. Interposed in conduit 62 is an adjustable constant pressure valve 66 for the purpose of reducing and controlling the pressure supplied to the valve 60 and thence to the conduit 64 or the conduit 65 as the case may be. A manually operated valve 67 is positioned in the conduit 64 for the purpose of metering the flow of air to the operating mechanism, which valve will hereinafter be termed a speed control valve.

Valve 60 is actuated in one direction by the solenoid 61 and in the other direction by the spring 70 or other suitable biasing means. Solenoid 61 is energized from a suitable current source 83 under the control of a foot switch 71 normally biased to open position and adapted to be closed by the foot of the machine operator to initiate the welding cycle. Switch 71 and solenoid 61 are connected in series with the line 83 through the conductors 84 and 85. When solenoid 61 is deenergized conduit 65 is connected with the inlet port 62 thereby admitting air under pressure to the cylinder 35 below piston 37 and conduit 64 is connected with exhaust port 63. If the lever 53 now be depressed both pistons 37 and 42 will rapidly move to their upper positions due to the pressure existing below piston 37 and exhaustion of the space above piston 42. Upon release of the lever 53, air pressure will again be supplied to the space within cylinder 35 above piston 42.

Energization of solenoid 61 by closing actuation of switch 71 interconnects conduit 64 with inlet conduit 62 and interconnects conduit 65 with exhaust port 63. Controlled air pressure will now build up between the two pistons in the cylinder 35 and the lower operating piston 37 will be moved downwardly. Piston 42 will remain in its lowermost adjusted position due to the full line pressure exerted above it. A line pressure of approximately eighty pounds per square inch and a pressure setting of approximately sixty pounds per square inch for the regulator 66 has been found to give satisfactory results.

The pressure maintained in the tank 28 by the regulator 31 which obviously is the pressure existent in the air lock 18 is a few pounds lower than the pressure maintained by the regulator 66 in the conduit 62 and consequently the piston 37 continues its downward travel after the electrode 12 has engaged the work but at a much reduced speed. Such movement, after work contact, is taken up by the telescoping members of the air lock 18. It should be observed that the tank 28 is of sufficient volume that no appreciable variation in the pressure exerted by the air lock takes place during the telescoping action of the lock. Thus the pressure exerted by the air within the lock may at all times be maintained slightly lower than the pressure exerted by the air above operating piston 37. Thus telescoping movement of the air lock 18 is insured.

Welding current may be supplied from a line 80 through switch 81 and conductors 82, the switch 81 being actuated by a solenoid 86. The latter is in series with one side of the current supply line 83, pressure responsive switch 93, conductor 94, timer 88, conductor 87 and conductor 91 leading to the opposite side of the line 83. Pressure responsive switch 93 is connected by conduit 92 with the bore 46 leading to the space between the pistons 37 and 42 and the operation of the parts is such that as the pressure builds up in the bore 46 due to the stoppage of the electrode 12 against the work, the switch 93 will be closed thereby energizing solenoid 86 and closing switch 81 to pass current to the welding transformer. Timer 88 breaks the solenoid 86 energizing circuit after a preselected number of cycles thus interrupting the flow of current to the transformer.

It should be observed that the welding current is applied immediately after the electrode 12 is stopped and since the outer quill 20 of the air lock 18 continues its descent at a much reduced speed after such stoppage, the welding current is applied during the initial phase of the relative movement between the telescoping members of the lock. Therefore, during the welding cycle the factor of overcoming any static friction between elements of the electrode moving means is entirely eliminated and uniform and better results are obtained. It is highly desirable that uniform welding pressure be maintained before, during and after the application of the heating current and this is particularly necessitated by the requirement of a quick but uniform downward movement of the electrode immediately upon softening of the metal by the current. It has been found that the principal cause of defective and non-uniform welding results is the erratic nature of the movement of the electrode upon the softening of the metal and it has further been observed that such erratic movement is due chiefly to the variable force required to overcome the static friction existing between the relatively movable members of the electrode moving assembly.

It has heretofore been proposed in the design of welding machines to employ a primary electrode moving means to provide the general operating stroke of the electrodes and to employ a secondary electrode moving means to provide for the forging movement of the electrode during the welding cycle. In accordance with the prior teaching, the latter, consisting of a spring or a closed air cylinder is positioned at one end of an integrated operating assembly, the electrode at the other end, and the primary electrode moving means incorporated in the assembly between the ends thereof. In this organization, the entire assembly, which is of substantial mass, must be moved to effect the forging movement of the electrode and consequently the forging movement is delayed past the optimum time and then takes place with a surging movement due to the large inertia of the moving assembly. The present invention overcomes these objectionable operating characteristics of the prior machines by positioning the secondary electrode moving means immediately adjacent the electrode to be moved. Thus the air lock 18 of the specifically disclosed embodiment is positioned immediately above the movable electrode 12 and between the primary electrode moving means and the electrode.

To minimize the binding between the parts of the air lock due to the eccentric loading imposed by the offset electrode, the interfitting cylinders 20 and 22 of the air lock are of substantial length.

Figure 3 illustrates a modified form of air lock which may be employed in place of the lock 18 of the machine of Figures 1 and 2. A cylindrical member 100 is slidably received in a bore which may be located in the bracket 14 and the member may be operated by the rod 38. A cylindrical member 101 of smaller diameter than the member 100 is concentrically positioned partially within the end of the latter and is rigidly secured thereto. Block 16 carrying electrode 12 is secured to the cylindrical member 102 which is adapted to telescope over the cylindrical member 101. Ball bearings 103 substantially eliminate the sliding friction between the members 101 and 102. A pin 104 extends diametrically through member 101 and is provided with a bearing 105 on each of its extending ends which bearings extend within slots 106 cut in the member 102. This arrangement limits the relative rotational and axial movement between the sleeves 101 and 102 without imposing any appreciable additional frictional load.

A flange 107 is welded or otherwise suitably secured to the lower end of the cylinder 100 and a second flange 108 is fastened to the sleeve 102 adjacent its lower end. A bellows 109 has its upper end securely fastened and sealed to the flange 107 and its lower end securely fastened and sealed to the flange 108. Air under uniform regulated pressure is supplied to the assembly through port 127 which is preferably connected with a tank in an arrangement similar to that shown in Figure 1. By reason of the expansion joint formed by the bellows 109 the carrier 16 and electrode 12 are constantly urged downwardly relative to the cylinder 100 by the air pressure existing in the assembly. The bellows seal and the ball bearings 103 eliminate substantially all operating friction in the assembly and enables improved welding results to be attained.

It should now be apparent that I have provided improved welding electrode actuating mechanism which satisfactorily accomplish the objects initially set out. By the use of relatively simple and easily constructed apparatus it is possible to obtain, first, adjustable short operating strokes of the welding electrode for carrying out a series of welds and during each of the welding operations the heating is accomplished and the movable electrode moves quickly to accomplish the welds while the movable electrode carrier is sliding relative to its driving means. Secondly, the use of the two pistons in the cylinder 35 provides means for rapidly retracting the electrode a substantially greater distance than that afforded by the operating stroke, thereby facilitating the positioning of work between the electrodes and the withdrawal therefrom of the completed work. The primary means for effecting the operating stroke is used in conjunction with the secondary pressure supplying means, i. e., the air lock, to effect superior dynamic characteristics in the operation of the machine whereby uniform high quality welds may be made.

The above specifically described embodiments of the invention should be considered as illustrative only as obviously many changes may be made therein without departing from the spirit or scope of the invention. For example, the desired differentiations in air pressures in various conduits and passages may be attained by employing sources of varying pressures rather than by the use of regulators as specifically disclosed.

What I claim is:

1. An electric welding machine comprising a normally fixed electrode, a movable electrode, means to move said movable electrode and to apply welding pressure therethrough comprising a cylinder, a piston in said cylinder operatively connected with said movable electrode, a second piston in said cylinder above said first mentioned piston, means to adjust the length of the downward stroke of said second mentioned piston and therefore its lowermost position in said cylinder, an air supplying conduit communicating with the space immediately above said upper piston, a second air supplying conduit communicating with the space between said pistons, a third air supplying conduit communicating with the space immediately below said first mentioned piston, a fluid pressure filled collapsible member interconnecting said movable electrode and said first mentioned piston, means to maintain said pressure substantially uniform whereby said member is operative to exert a substantially constant force on said movable electrode during downward movement of said first mentioned piston and collapsing of said member, means to normally maintain fluid pressure in said first mentioned conduit whereby said upper piston will normally be maintained in its lowermost position, means to supply a lower fluid pressure to said second and third mentioned conduits alternately whereby said first mentioned piston will be reciprocated an extent determined by the lowermost position of said upper piston during normal operation of said welding machine, and means to discontinue the pressure in said first mentioned conduit whereby said lower pressure applied to said third mentioned conduit is operative to move both said pistons to their uppermost positions to move said electrodes far apart.

2. An electrode welding machine comprising a normally fixed electrode, a movable electrode, means to supply welding current to said electrodes, a fluid pressure collapsible member mechanically interconnecting said movable electrode and a primary electrode moving means, said primary electrode moving means being adapted to reciprocate said collapsible member and said movable electrode, said collapsible member being operative to exert a constant expansive force between said movable electrode and said primary electrode moving means, and means operative during the movement of said primary means towards said electrode and the collapsing of said collapsible member to control the flow of current to said electrodes.

3. An electrode welding machine comprising a normally fixed electrode, a movable electrode, means to supplying welding current to said electrodes, means to move said movable electrode towards and away from said fixed electrode comprising a cylinder and a piston therein operatively connected with said movable electrode, a second piston within said cylinder on the side of said first mentioned piston opposite said electrode, means to vary the length of stroke and therefore the innermost position of said second mentioned piston, means to alternately supply fluid under pressure to the space between the cylinder end and piston nearest the electrode and the space between the pistons, and means to supply fluid under greater pressure to the space between the other end of the cylinder and the piston farthest away from the electrode.

4. Apparatus according to claim 3 further characterized by the inclusion of a fluid pressure operated collapsible member mechanically interposed between said movable electrode and said first mentioned piston, and means to maintain constant pressure within said collapsible member whereby the expansive force exerted thereby will be constant regardless of the extent of expansion or collapse of said member.

5. Apparatus according to claim 3 further characterized by the inclusion of a fluid pressure collapsible member mechanically interposed between said movable electrode and said first mentioned piston, means to maintain a constant fluid pressure within said collapsible member whereby the same will exert a constant expansive force regardless of the extent of expansion or collapse of said member, and means to regulate the pressure exerted by said first mentioned piston in a direction toward said fixed electrode whereby said first mentioned piston will continue to move slowly in said direction and said collapsible member will slowly collapse after said movable electrode is brought into pressure contact with work positioned between said electrodes.

6. An electric welding machine comprising a fixed electrode, a movable electrode, means to supply welding current to said electrodes, a motor for moving said movable electrode toward and away from said fixed electrode, a fluid pressure collapsible member interposed between said movable electrode and said motor, means to maintain constant the pressure of the fluid within said collapsible member regardless of the extent of expansion or collapse of said member whereby the expansive force exerted thereby between said movable electrode and said motor remains substantially constant, said motor being capable of exerting a force greater than the said expansive force whereby said member will be caused to be collapsed after the pressure contact has been established between said movable electrode and work positioned between said electrodes, and means operative during the said collapsing of said member in control of the supply of current to said electrode.

7. An electric welding machine comprising a fixed electrode, a movable electrode, means to supply welding current to said electrodes, a motor for moving said movable electrode toward and away from said fixed electrode, a collapsible member interposed between said movable electrode and said motor, said collapsible member adapted to be filled with fluid under pressure, a tank for the storage of a substantial volume of fluid under pressure, a conduit interconnecting the space within said member with said tank, means to maintain constant the pressure of the fluid within said tank, said motor being operative to collapse said member upon pressure engagement of said movable electrode with work positioned between said electrodes.

8. Apparatus according to claim 7 further characterized by the inclusion of means to control the flow of welding current to said electrode, said means being operative to time the flow of current in such manner that the flow occurs during the collapsing of said member.

9. An electric welding machine comprising a normally fixed electrode, a movable electrode, a piston supporting said movable electrode, a cylinder about said piston, means to move said cylinder toward and away from said fixed electrode, fluid under pressure in said cylinder and operative to urge said piston toward said fixed electrode, and means to maintain constant the pressure of said fluid regardless of the position of said piston and said cylinder.

10. Apparatus according to claim 9 in which the said means to move said cylinder toward and away from said fixed electrode is operative to exert a controlled force acting in a direction toward said fixed electrode which is greater than the expansive force exerted by the fluid under pressure within said cylinder.

11. Apparatus according to claim 9 in which said means to move said cylinder comprises a second piston within a second cylinder, means to vary the effective length of said second cylinder, and means to alternately supply fluid pressure to the opposite sides of said second piston within said second cylinder.

12. An electric welding machine comprising in combination a normally fixed electrode, a movable electrode, means to supply welding current to said electrodes, means to move said movable electrode towards and away from said fixed electrode comprising a carrier for said movable electrode, a motor having a reciprocating driving element operatively connected with said carrier, means to engage said element at each end of its stroke to determine its normal length of stroke, means to vary the position of one of said engaging means to alter the length of said normal stroke whereby during normal operation of said machine the extent of movement of said movable electrode may be varied, and power operated means to retract said carrier and movable electrode a distance substantially greater than the length of the adjusted normal operating stroke.

13. An electric welding machine comprising in combination a normally fixed electrode, a movable electrode, means to supply welding current to said electrodes, means to move said movable electrode towards and away from said fixed electrode comprising a carrier for said movable electrode, a motor having a reciprocating driving element operatively connected with said carrier, means to engage said element at each end of its stroke to determine its normal length of stroke, and power operated means to retract said carrier and movable electrode a distance substantially greater than the length of the adjusted normal operating stroke.

14. An electric welding machine comprising in combination a normally fixed electrode, a movable electrode, means to supply welding current to said electrodes, means to move said movable electrode towards and away from said fixed electrode comprising a carrier for said movable electrode and a motor having a reciprocating driving element operatively connected with said carrier, said element having a normally fixed length of operating stroke, power operated means to vary the length of said stroke whereby said carrier and movable electrode may be retracted a substantial distance beyond the normal operating range of said carrier for the movable electrode, a fluid pressure filled collapsible member mechanically interposed between said element and said carrier, and means to maintain substantially constant pressure within said collapsible member whereby the expansive force exerted thereby will be substantially constant regardless of the extent of expansion or collapse of said member.

15. An electric welding machine comprising in combination a normally fixed electrode, a movable electrode, means to supply welding current to said electrodes, means to move said movable electrode towards and away from said fixed electrode comprising a carrier for said movable electrode and a motor having a reciprocating driving element operatively connected with said carrier, said element having a normally fixed length of operating stroke, power operated means to vary the length of said stroke whereby said carrier and movable electrode may be retracted a substantial distance beyond the normal operating range of said carrier for the movable electrode, a fluid pressure filled collapsible member mechanically interposed between said carrier and said element, means to maintain substantially constant pressure within said collapsible member whereby the expansive force exerted thereby will be substantially constant regardless of the extent of expansion or collapse thereof, and means operable upon collapsing of said member in control of said first mentioned means to supply welding current.

16. An electric welding machine comprising in combination a normally fixed electrode, a movable electrode, means to supply welding current to said electrodes, means to move said movable electrode towards and away from said fixed electrode comprising a cylinder and a piston therein operatively connected with said movable electrode, a second piston within said cylinder above said first mentioned piston, a rod connected to said second mentioned piston and extending outwardly through the adjacent end of said cylinder, means adjustably secured to said rod to adjustably limit the inward movement of said rod, means to supply fluid pressure to above said second mentioned piston to normally retain said second mentioned piston in its lowermost adjusted position, means to alternately supply a lower fluid pressure to opposite sides of said first mentioned piston to provide a normal operating stroke for said movable electrode, and means to withdraw the pressure above said second mentioned piston whereby said movable electrode may be retracted a substantial distance beyond its normal operating stroke.

STANLEY M. HUMPHREY.